United States Patent [19]

Noro

[11] Patent Number: 5,574,086
[45] Date of Patent: Nov. 12, 1996

[54] GRANULAR VINYL CHLORIDE RESIN COMPOSITION AND PROCESS FOR ITS PRODUCTION

[75] Inventor: Yukio Noro, Yokkaichi, Japan

[73] Assignee: Mitsubishi Chemical Corporation, Tokyo, Japan

[21] Appl. No.: 278,498

[22] Filed: Jul. 21, 1994

[30] Foreign Application Priority Data

Jul. 23, 1993 [JP] Japan .................... 5-182715

[51] Int. Cl.⁶ .................... C08K 9/04; C08K 5/12
[52] U.S. Cl. .................... 524/296; 524/297; 524/423; 524/425; 524/437; 524/451; 523/264; 523/351; 523/352
[58] Field of Search .................... 524/423, 296, 524/297, 425, 437, 451, 447, 567, 569; 525/239; 427/459, 461; 523/221, 204, 351, 352; 264/343, 328.18; 528/484, 485

[56] References Cited

U.S. PATENT DOCUMENTS

| | | | |
|---|---|---|---|
| 3,090,763 | 5/1963 | Hillier | 525/239 |
| 3,208,965 | 9/1965 | Kuhne et al. | 524/297 |
| 3,247,158 | 4/1966 | Alford et al. | 524/296 |
| 3,264,371 | 8/1966 | Gruber et al. | 525/239 |
| 3,318,825 | 5/1967 | Enk et al. | 524/296 |
| 3,326,831 | 6/1967 | Avtges | 523/221 |
| 3,342,381 | 9/1967 | Simons et al. | 524/296 |
| 3,555,122 | 1/1971 | Simons | 525/239 |
| 3,563,936 | 2/1971 | Merrill et al. | 524/296 |
| 3,635,928 | 1/1972 | Thomas | 528/485 |
| 3,725,325 | 4/1973 | Takeda et al. | 524/296 |
| 3,883,494 | 5/1975 | Winter et al. | 524/296 |
| 3,899,473 | 8/1975 | Johansson | 524/399 |
| 3,919,164 | 11/1975 | Hattori et al. | 523/221 |
| 4,002,702 | 1/1977 | Kuhn . | |
| 4,091,197 | 5/1978 | Fischer et al. | 524/296 |
| 4,116,908 | 9/1978 | Emery | 523/351 |
| 4,356,283 | 10/1982 | Weirlich et al. | 523/221 |
| 4,429,071 | 1/1984 | Itoh et al. | 524/296 |
| 4,490,323 | 12/1984 | Thomson | 523/351 |

FOREIGN PATENT DOCUMENTS

| | | |
|---|---|---|
| 0 369387 | 5/1990 | European Pat. Off. . |
| 0 553653 | 8/1993 | European Pat. Off. . |
| 2257182 | 3/1973 | Germany . |

OTHER PUBLICATIONS

Penn, W. S. "*PVC Technology*"–336–345 (1966).
Sarvetnick, H. A. "*Polyvinyl Chloride*" 173–184 (1969).
Sarvetnick, H. A. "*Polyvinyl Chloride*" 185–191.

*Primary Examiner*—Veronica P. Hoke
*Attorney, Agent, or Firm*—Oblon, Spivak, McClelland, Maier & Neustadt, P.C.

[57] ABSTRACT

A granular vinyl chloride resin composition in the form of spherical or cylindrical granules having a size of from 0.05 to 20 mm made of a mixture comprising, as the main components, 100 parts by weight of fine vinyl chloride resin particles having a particle size of from 0.01 to 3 μm, a course vinyl chloride resin having a particle size of 5 to 65 μm and from 10 to 400 parts by weight of a filler.

22 Claims, No Drawings

GRANULAR VINYL CHLORIDE RESIN COMPOSITION AND PROCESS FOR ITS PRODUCTION

The present invention relates to a granular vinyl chloride resin composition containing a filler, which is less likely to undergo dusting during its handling and excellent in the powder flowability and which is useful as a paste resin, and a process for its production.

It has been attempted to granulate a paste making vinyl chloride resin in order to make automatic weighing possible or to prevent dusting of a vinyl chloride resin for a paste which is fine powder. For example, Japanese Unexamined Patent Publications No. 133409/1990 and 133410/1990 disclose a process which comprises drying an aqueous dispersion of a vinyl chloride resin for a paste by means of a spray dryer using a rotary disk type atomizer and producing a granulated vinyl chloride resin by adjusting the number of rotation of the rotary disk at the time of drying and the temperature and humidity of the drying air. However, in order to attain a large size for granules by this process, it is usually necessary to reduce the number of rotation of the rotary disk, and in such a case, no adequate drying can be accomplished unless the drying temperature is set at a high level. However, a granular resin dried at a high temperature tends to be hard and cannot be readily dispersed in a plasticizer. Accordingly, it tends to be difficult to prepare a plastisol for the preparation of a paste, or the viscosity of the plastisol is likely to be high.

Further, Japanese Examined Patent Publication No. 23180/1973 discloses a process for producing a granular vinyl chloride resin, which comprises adding a liquid flocculating agent to fine powder of a vinyl chloride resin for paste, followed by granulation by an extruder and then drying the obtained granules by a fluidized dryer. Probably because the drying temperature is as high as 80° C., the granular vinyl chloride resin obtained by this process is required to be pulverized for a long period of time by e.g. a pulverizer to prepare a plastisol, and it is in many cases difficult to prepare a plastisol by a usual apparatus for the preparation of a sol, such as a blender or dissolver.

U.S. Pat. No. 4,002,702 discloses a process for producing a vinyl chloride resin for a paste excellent in the powder flowability, which comprises adding a dried resin for forming nuclei to a dispersion (latex) containing fine vinyl chloride resin particles, followed by drying. However, even if the granular resin obtained by this process is employed, the effect for improving the working efficiency is still insufficient due to dusting of the filler itself, when the composition contains such a filler.

Namely, except for a product of transparent type, it is common that a shaped product prepared from a plastisol contains a filler such as calcium carbonate. Therefore, it is usually necessary to incorporate and mix a filler during the preparation of a plastisol, whereby dusting of the filler is problematic, and improvements have been desired from both aspects of working efficiency and working environment. However, granulation of the filler, particularly a technique of granulating the filler together with the vinyl chloride resin for a paste, has not been reported.

It is an object of the present invention to provide a granular vinyl chloride resin composition containing a filler, which is less likely to undergo dusting during handling of the powder and which is excellent in the powder flowability to make automatic weighing possible and which can readily be dispersed into a plasticizer to form a plastisol, and a process for its production and a plastisol composition obtained from such a granular vinyl chloride resin composition.

Firstly, the present invention provides a granular vinyl chloride resin composition in the form of spherical or cylindrical granules having a size of from 0.05 to 20 mm made of a mixture comprising, as the main components, 100 parts by weight of vinyl chloride resin particles having a particle size of from 0.01 to 3 μm (hereinafter referred to as fine vinyl chloride resin particles) and from 10 to 400 parts by weight of a filler, or such a granular vinyl chloride resin composition wherein said mixture further contains vinyl chloride resin particles having a particle size of from 5 to 65 μm (hereinafter referred to as coarse vinyl chloride resin particles) in an amount of at most 100 parts by weight per 100 parts by weight of the fine vinyl chloride resin particles.

Secondly, the present invention provides a process for producing a granular vinyl chloride resin composition, which comprises adding and mixing to a vinyl chloride polymer latex (hereinafter sometimes referred to as the latex) containing fine vinyl chloride resin particles obtained by emulsion polymerization or fine suspension polymerization, a filler in an amount of from 10 to 400 parts by weight per 100 parts by weight of the fine vinyl chloride resin particles and, if necessary, coarse vinyl chloride resin particles in an amount of at most 100 parts by weight per 100 parts by weight of the fine vinyl chloride resin particles, and then shaping the mixture into spherical or cylindrical granules having a size of from 0.05 to 20 mm.

Thirdly, the present invention provides a plastisol composition prepared by blending to the above-mentioned granular vinyl chloride resin composition a plasticizer in an amount of from 30 to 400 parts by weight per 100 parts by weight of the vinyl chloride resin in the granular vinyl chloride resin composition.

Now, the present invention will be described in detail.

The fine vinyl chloride resin particles as the essential resin component of the granular vinyl chloride resin composition of the present invention are particles having a particle size of from 0.01 to 3 μm, and they are usually prepared by emulsion polymerization or fine suspension polymerization. Such fine vinyl chloride resin particles may be those obtained by spray-drying a vinyl chloride polymer latex obtained by the above-mentioned polymerization method, then finely pulverizing the dried product by a pulverizer such as a hammer mill and removing particles having a particle size exceeding 3 μm.

The emulsion polymerization is a method wherein e.g. vinyl chloride alone or a mixture of a vinyl chloride and a comonomer copolymerizable therewith, such as vinyl acetate, an alkyl (meth)acrylate, ethylene or propylene, (hereinafter referred to generally as "vinyl chloride monomer"), is subjected to radical polymerization in the presence of an emulsifier such as sodium lauryl sulfate or sodium dodecylbenzene sulfonate and a water-soluble polymerization initiator.

The fine suspension polymerization is a method wherein the vinyl chloride monomer is subjected to homogenizing treatment together with an emulsifier and/or a dispersant and a polymerization initiator soluble in vinyl chloride, by a dispersing machine such as a homogenizer, followed by polymerization.

The majority of the particles of vinyl chloride resin in the vinyl chloride polymer latex produced by these methods is fine particles having a size of from 0.01 to 3 μm, usually from 0.1 to 2 μm. However, sometimes, coarse particles are likely to form during the polymerization, and in the present invention, such coarse particles are preferably removed by e.g. filtration, pulverization in liquid or separation by sedimentation. Very fine particles having a particle size of less than 0.01 μm tend to increase the viscosity of the plastisol, and coarse particles exceeding 3 μm tend to impair the stability of the latex. Further, it is preferred to reduce the water content by a method such as ultrafiltration before using this vinyl chloride polymer latex.

The filler is not particularly limited so long as it is the one commonly used for vinyl chloride resins. It may usually be an inorganic filler such as heavy or light calcium carbonate, magnesium carbonate, barium sulfate, aluminum hydroxide, talc, clay, diatomaceous earth, kaolin or glass balloons, or an organic filler such as rubber powder, cellulose powder, various fibers or wood powder. An inorganic filler, particularly calcium carbonate, is preferred. The particle size of the filler varies depending upon the particular purpose of the granular vinyl chloride resin composition. However, it is usually preferred to employ the one having a particle size within a range of from 0.01 to 100 μm, preferably from 0.05 to 65 μm, more preferably from 0.05 to 20 μm, from the viewpoint of the dispersion stability of the plastisol prepared from the granular vinyl chloride resin composition.

If the particle size of the filler is very fine at a level of e.g. less than 0.01 μm, the viscosity of the resulting plastisol tends to be high, and if it is extremely coarse at a level exceeding 100 μm, the plastisol is likely to undergo separation or sedimentation.

The amount of the filler is usually from 10 to 400 parts by weight per 100 parts by weight of the fine vinyl chloride resin particles. The preferred range varies depending upon the process for preparation and the particular purpose of the granular vinyl chloride resin composition, but it is usually selected within a range of from 30 to 200 parts by weight. If the amount of the filler exceeds 400 parts by weight, uniform mixing tends to be difficult, and the operation efficiency in the process for producing granules tends to be poor. On the other hand, if it is less than 10 parts by weight, the significance of preliminarily incorporating the filler will be less, and no adequate improvement in the operation efficiency will be obtained for the molding operation which is carried out by incorporating, in many cases, a large amount of the filler.

Coarse vinyl chloride resin particles having a particle size of from 5 to 65 μm may be incorporated to the granular vinyl chloride resin composition of the present invention for the purpose of reducing the viscosity of the plastisol prepared from the resin composition. As such coarse particles, it is preferred to use those obtained by spray-drying a vinyl chloride polymer latex using a spraying method such as rotary-disk, pressure nozzle, or double fluid nozzle system followed by classification into a desired particle size range. Here, the gas stream temperature at the outlet of the spray drying apparatus is usually adjusted to a level of from 30° to 80° C., but from the viewpoint of the stability when the product is dispersed in a plasticizer, the gas stream temperature is preferably within a range of from 45° to 60° C. Further, it is preferred to employ a double fluid nozzle system as a spray drying method, since the viscosity of the sol will be low, and the viscosity stability will be excellent. In this case, the gas stream temperature at the outlet of the drying apparatus is more preferably adjusted to be within a range of from 50° to 60° C. from the viewpoint of the viscosity of the plastisol.

As the above coarse vinyl chloride resin particles, a vinyl chloride resin for a paste so-called "a blending resin" may also be employed. The blending resin is usually prepared by polymerizing a vinyl chloride monomer in the presence of a dispersant and/or an emulsifier and a polymerization initiator soluble in the vinyl chloride, and individual particles are single spherical particles i.e. not secondary aggregates of fine particles obtainable by spray-drying a vinyl chloride polymer latex. These particles are usually obtainable in the form of particles having substantially a uniform particle size of from 5 to 100 μm. However, when they are used in the present invention, it is preferred to adjust the particle size within a range of from 5 to 65 μm, preferably from 20 to 40 μm, by classification of the formed particles or by adjusting the polymerization method.

The coarse vinyl chloride resin particles as described above are added in an amount of at most 100 parts by weight per 100 parts by weight of the fine vinyl chloride resin particles. If the coarse vinyl chloride resin particles are added in an amount exceeding 100 parts by weight, no adequate effect of reducing the viscosity of the plastisol to be prepared from the resulting granular vinyl chloride resin composition, can, be obtained, and inversely, the viscosity tends to increase, particularly within a range where the shear rate is higher than 100 sec$^{-1}$.

Other additives may be incorporated to the granular vinyl chloride resin composition of the present invention, as the case requires. For example, a stabilizer, an antioxidant, an ultraviolet absorber, a coloring agent, a flame retardant or a plasticizer may be incorporated.

The granular vinyl chloride resin composition of the present invention can be produced, for example, as follows.

① To a vinyl chloride polymer latex, a filler in an amount of from 10 to 400 parts by weight per 100 parts by weight of the fine vinyl chloride resin particles in the latex, and, if necessary, coarse vinyl chloride resin particles and/or other additives, are mixed, and the solid content concentration of the mixture is adjusted, for example, to a level of from 55 to 95% by weight (water content: 5 to 45% by weight). Then, the mixture is extrusion-molded within a temperature range of from 10° to 50° C. and cut into a cylindrical shape with a diameter of from 0.1 to 3 mm and a length of from 3 to 10 mm, or granulated by rolling. Thereafter, the moisture remaining in the granulated product is removed by a drying operation such as fluidized drying, plate drying or vacuum drying usually within a temperature range of from 10° to 50° C. If the solid content concentration of the mixture is outside the above range, the granulation condition tends to be improper. Further, if the drying temperature of the granulated product is less than 10° C., it takes too much time for drying, and if it exceeds 50° C., the dispersibility at the time of mixing with the plasticizer tends to be poor, and it will take time to prepare a plastisol.

② To a vinyl chloride polymer latex, a filler in an amount of from 10 to 400 parts by weight per 100 parts by weight of the fine vinyl chloride resin particles in the latex, and, if necessary, coarse vinyl chloride resin particles and/or other additives, are mixed, and the mixture is spray-dried so that the gas stream temperature at the outlet of the spray drying apparatus is kept within a range of from 30° to 80° C., preferably from 45° to 60° C. to obtain spherical particles having a particle size of usually from 0.05 to 0.30 mm.

③ Fine vinyl chloride resin particles, a filler in an amount of from 10 to 400 parts by weight per 100 parts by weight of the fine vinyl chloride resin particles, and, if necessary, coarse vinyl chloride resin particles and/or other additives are uniformly mixed in a powder state in predetermined amounts, and this mixture is wetted with wetting agents such as water, an alcohol, a plasticizer or a surfactant, whereupon it is shaped into a spherical or cylindrical shape having a size of from 0.05 to 20 mm by such a method as rolling-type granulation or extrusion-type granulation.

In the present invention, the method described in ① is particularly preferred.

The size of the granules of the granular vinyl chloride resin composition is within a range of from 0.0.5 to 20 mm. If the size is less than 0.05 mm, no adequate effect for prevention of dusting can be obtained. On the other hand, if it exceeds 20 mm, the time for dispersing the granules to obtain a plastisol tends to be too long.

When the granules are of a cylindrical shape, the diameter is preferably from 0.1 to 3 mm, and the length is preferably from 3 to 10 mm, from the viewpoint of the flowability and handling efficiency.

The granular vinyl chloride resin composition of the present invention may be mixed with a plasticizer in an amount of from 30 to 400 parts by weight, preferably from 40 to 200 parts by weight, per 100 parts by weight of the vinyl chloride resin in the composition, followed by stirring, whereby it is readily dispersed in the plasticizer to form a stable plastisol composition, which is useful for various paste processings.

As the plasticizer to be used here, any plasticizer may be used without any particular restriction so long as it is a plasticizer commonly used for vinyl chloride resins. For example, phthalic acid diesters such as di-n-octyl phthalate, di-2-ethylhexyl phthalate, diisononyl phthalate, diisodecyl phthalate, butylbenzyl phthalate and isononylbenzyl phthalate, trimellitic acid triesters such as tri-2-ethylhexyl trimellitate and triisodecyl trimellitate, fatty acid diesters such as di-2-ethylhexyl adipate, or polyester plasticizers obtained by polycondensation of phthalic acid, adipic acid, etc. with diols, may be used alone or in combination as a mixture of two or more of them.

For the preparation of this plastisol composition, a dispersing and mixing machine such as a dissolver, a ribbon blender or a kneader, may be employed.

Further, when the granular vinyl chloride resin composition of the present invention is to be dispersed into a plastisol for molding, other additives such as a stabilizer, an antioxidant, an ultraviolet absorber, a coloring agent and a flame retardant, may be added, as the case requires.

Now, specific embodiments of the present invention will be described with reference to Examples. However, it should be understood that the present invention is by no means restricted by the following Examples. In the Examples, "%" and "parts" means "% by weight" and "parts by weight", respectively, unless otherwise specified Evaluation methods: A vinyl chloride polymer latex (A), coarse vinyl chloride resin particles (B), a filler (C) and granules of a granular vinyl chloride resin composition were evaluated as follows.

(1) Measurement of particle sizes

① Particle size of fine vinyl chloride resin particles in the latex (A)

Measured by means of a laser diffraction-type particle size distribution measuring apparatus (LA-700, manufactured by Horiba Seisakusho K.K.).

② Particle sizes of the coarse vinyl chloride resin particles (B) and the filler (C)

Measured by means of a laser diffraction-type particle size distribution measuring apparatus (LA-500, manufactured by Horiba Seisakusho K.K.).

③ Particle size of granules of the granular vinyl chloride resin composition

Measured by a Tyler standard sieve.

(2) Particle shape

Observed by a scanning type electron microscope.

(3) Powder flowability

Using a powder tester (manufactured by Kabushiki Kaisha Hosokawa Micron), the angle of repose was measured. The smaller the angle of repose, the better the powder flowability.

(4) Bulk density and compressibility

Using the same powder tester, the bulk density and the compressibility were measured as follows in accordance with the instructions for the measurement method attached to the tester. Firstly, so-called "bulk density" as referred to e.g. in JIS (hereinafter referred to as "loose BD") was measured. Then, the powder container of the powder tester was gently tapped ("tapping"), whereby the powder in the container was packed, and to compensate the volume reduced by tapping, the powder was further added. This tapping and addition were repeated twice or three times, whereupon the bulk density was measured again (hereinafter referred to as "packed BD"). The compressibility was calculated in accordance with the following formula from the packed BD and the loose BD.

Compressibility (%)=(packed $BD$–loose $BD$)×100/packed $BD$

The smaller the compressibility, the less the tendency for the powder being packed and losing the flowability during the storage in a hopper or silo, i.e. the better the powder flowability, and the easier the handling.

(5) Viscosity of the plastisol

① Initial viscosity: 100 parts by weight of a granular vinyl chloride resin composition and 60 parts by weight or 100 parts by weight of a plasticizer were taken and mixed by a planetary mixer (Hobart Mixer N-50 Model, manufactured by The Hobart Manufacturing Co., Ltd.) at a No. 1 speed (61 rpm) for 5 minutes and at No. 2 speed (125 rpm) for 15 minutes to obtain a plastisol. This plastisol was left to stand for 2 hours in a constant temperature humidity chamber at 23° C. under a relative humidity of 50%, whereupon the viscosity was measured by a B Model viscometer (Brookfield Viscometer) B8H Model with No. 5 rotor at 50 rpm.

② Viscosity upon expiration of sometime: the above plastisol was left to stand for 24 hours after the preparation in a constant temperature and humidity chamber at 23° C. under a relative humidity of 50%, whereupon the viscosity was measured in the same manner as above.

(6) Dispersibility of the sol (the number of undispersed particles in the plastisol)

The plastisol prepared in the above item (5) was filtered by a metal net (diameter: 20 cm) of 60 mesh, and the number of undispersed particles remaining on the metal net was counted. The smaller the number, the better the dispersibility of the sol of the resin.

(7) Film test

The plastisol prepared in the above item (4) was coated in a thickness of 150 μm on a glass plate by a bar coater, followed by heating at 170° C. for 10 minutes, to obtain a sheet, and the surface condition of the sheet was visually observed and evaluated.

EXAMPLES 1 TO 6

(1) Preparation of a vinyl chloride polymer latex (A)

Into a polymerization reactor equipped with an agitator and having a capacity of 300 l, 90 kg of deionized water at a temperature of 54° C., 10 g of potassium persulfate and 50 g of sodium pyrosulfite were introduced and stirred for about 20 minutes for dissolution. Then, the interior of the polymerization tank was vacuumed to 200 hPa (−610 mmHg·G) and maintained at 55° C. for 50 minutes.

Then, 60 kg of a vinyl chloride monomer was charged to the polymerization reactor, and the internal temperature of the polymerization reactor was maintained at 50° C. Upon expiration of 15 minutes after completion of charging the monomer, a preliminarily prepared 0.2% potassium persulfate aqueous solution was gradually added at a rate of about 10 ml/min, and then the reaction was carried out while adjusting the rate of addition of the potassium persulfate aqueous solution so that a constant polymerization rate was maintained. When conversion reached about 15%, addition of an aqueous sodium lauryl sulfate solution (concentration: about 8%) was started, and the same aqueous solution was added at a rate of about 80 ml/10 min until the total amount of added sodium lauryl sulfate became 360 g. When the internal pressure of the reactor dropped from the saturation pressure at 50° C. of the vinyl chloride monomer by 1960 hPa (2.0 kg/cm$^2$), the reaction was terminated, and an unreacted monomer was recovered to obtain a vinyl chloride polymer latex. The obtained latex was monodisperse polymer particles having a particle size of about 0.5 μm, and the stability of the latex was excellent.

Then, into a polymerization reactor equipped with an agitator and having a capacity of 300 l, 4.5 kg (as solid content) of the above latex as a seed polymer and 80 kg of deionized water were charged and then deaerated. Then, 25.5 kg of a vinyl chloride monomer was charged, and the temperature was raised to 57° C. Then, a redox polymerization initiator of hydrogen peroxide-sodium formaldehyde sulfoxylate was continuously added in a total amount of 0.05% (relative to the vinyl chloride monomer) while adjusting the adding speed so that a constant polymerization rate was maintained. From the time when conversion reached 10% to the completion of polymerization, an aqueous solution containing about 8% of sodium lauryl sulfate was continuously added at a rate of about 0.1 l/hr. Further, from the time when the conversion reached 15%, a total amount of 70 kg of vinyl chloride monomer was added at a rate of 6 kg/10 min. When the internal pressure of the polymerization tank dropped from the saturation pressure of the vinyl chloride monomer at 57° C. by 980 hPa (1 kg/cm$^2$), addition of the initiator was stopped to terminate the polymerization, and an unreacted vinyl chloride monomer was recovered. The obtained latex contained polymer particles having an average particle size of about 0.9 μm and had a solid content concentration of 43.6%. This latex was concentrated by ultrafiltration to a solid content concentration of 48.0%.

(2) Coarse vinyl chloride resin particles (B)

The latex (A) prepared as described above, was spray-dried under the conditions as identified in the following Table to obtain coarse particles (B-1) and (B-2). Further, commercially available blending resin (Vinika™ blending resin 75BX, manufactured by Mitsubishi Kasei Vinyl Company) was used as coarse particles (B-3). Coarse particles (B-1) correspond to a common vinyl chloride resin for a paste.

(3) Filler (C) for vinyl chloride

Commercially available heavy calcium carbonate (Whiton H, manufactured by Shiraishi Calcium K.K.) was used. The average particle size of this calcium carbonate was 18 μm.

(4) Preparation of a granular vinyl chloride resin composition

To the above-mentioned vinyl chloride polymer latex (A) having a solid content concentration of 48% in an amount of 100 parts by weight (the amount as the latex, which corresponds to 48 parts by weight as the solid content of fine vinyl chloride resin particles), the coarse vinyl chloride resin particles (B) and calcium carbonate (C) as the filler were mixed and stirred in the proportions as identified in Table 1 to obtain a wet cake-like or wet powder-like composition. This composition was granulated at room temperature by means of an extrusion granulating machine (Fine Disk Pelleter PV-5 Model, manufactured by Fuji Powdal K.K.) equipped with a multi-perforated screen with a opening diameter of 1.0 mm (Examples 1 to 3) or granulated into a spherical shape by a rolling type granulator (Mulmerizer Q-230 Model, manufactured by Fuji Powdal K.K.) (Examples 4 to 6), and then the above granulated product was dried at 45° C. by a fluidized drier to obtain a granular vinyl chloride resin composition.

The properties of the respective granular vinyl chloride resin compositions and plastisol compositions obtained therefrom are shown also in Table 1. The composition of the granular vinyl chloride resin compositions is such that per 100 parts by weight of the fine vinyl chloride resin particles, the coarse vinyl chloride resin particles are 62.5 parts by weight, and the filler is 81.25 parts by weight in Examples 1 to 3 and 325 parts by weight in Examples 4 to 6. (If this is calculated by a commonly employed representation method, the filler is 50 parts by weight or 200 parts by weight per 100 parts by weight of the total amount of the vinyl chloride resins.)

The amount of the plasticizer used in the preparation of the plastisol is 60 parts by weight in Examples 1 to 3 and 100 parts by weight in Examples 4 to 6, per 100 parts by weight of the vinyl chloride resin (total amount) in the granular vinyl chloride resin composition.

COMPARATIVE EXAMPLES 1 AND 2

The coarse vinyl chloride resin particles (B-1) and the filler were mixed in the proportions as identified in Table 1, and the angle of repose of the mixture was measured. The composition of this mixture was such that the filler was 50 parts by weight or 200 parts by weight per 100 parts by weight of the coarse vinyl chloride resin particles (common resin for a paste).

| Coarse vinyl chloride resin particles | Spraying system | Outlet temperature of drying apparatus | Average particle size (μm) | Particle size distribution (μm to μm) | Shape |
|---|---|---|---|---|---|
| (B-1) | Rotary disk (classified product) | 55° C. | 9 | 5 to 16 | Non-specific |
| (B-2) | Double fluid nozzle | 60° C. | 30 | 11 to 55 | Spherical |
| (B-3) | (Blending resin) | — | 35 | 20 to 60 | Spherical |

Further, a plasticizer was added to this mixture to obtain a plastisol, and its properties were compared. The amount of the plasticizer was 60 parts by weight in Comparative Example 1 and 100 parts by weight in Comparative Example 2, per 100 parts by weight of the coarse vinyl chloride resin particles in the mixture.

TABLE 1

Blend system of (A), (B) and (C)

| | Type | Ratio (wt) | Solid content concentration (wt %) | State |
|---|---|---|---|---|
| Example 1 | A/(B-1)/C | 100/30/39 | 69 | Wet cake |
| Example 2 | A/(B-2)/C | 100/30/39 | 69 | Wet cake |
| Example 3 | A/(B-3)/C | 100/30/39 | 69 | Wet cake |
| Example 4 | A/(B-1)/C | 100/30/156 | 82 | Wet powder |
| Example 5 | A/(B-2)/C | 100/30/156 | 82 | Wet powder |
| Example 6 | A/(B-3)/C | 100/30/156 | 82 | Wet powder |
| Comparative Example 1 | (B-1)/C | 78/39 | 100 | Dry powder |
| Comparative Example 2 | (B-1)/C | 78/156 | 100 | Dry powder |

Granular resin

| | Shape | Average particle size (mm) | Angle of repose (degree) | BD (loose BD) (g/cc) | Compressibility (%) |
|---|---|---|---|---|---|
| Example 1 | Cylindrical | 1 | 34 | 0.65 | 10 |
| Example 2 | Cylindrical | 1 | 34 | 0.65 | 10 |
| Example 3 | Cylindrical | 1 | 34 | 0.65 | 10 |
| Example 4 | Spherical | 5 | 32 | 0.86 | 4 |
| Example 5 | Spherical | 5 | 32 | 0.87 | 4 |
| Example 6 | Spherical | 5 | 32 | 0.87 | 4 |
| Comparative Example 1 | — | — | 51 | 0.39 | 39 |
| Comparative Example 2 | — | — | 51 | 0.56 | 40 |

Plastisol

| | Viscosity (Pa · s) Initial | Viscosity (Pa · s) 24 hrs later | Film test | Number of non-dispersed particles in sol (Number of particles remained on 60 mesh screen) |
|---|---|---|---|---|
| Example 1 | 5.6 | 6.3 | Good | 0 |
| Example 2 | 5.1 | 5.6 | Good | 0 |
| Example 3 | 4.7 | 5.5 | Good | 0 |
| Example 4 | 7.1 | 8.6 | Good | 3 to 5 |
| Example 5 | 6.5 | 7.2 | Good | 3 to 5 |
| Example 6 | 6.1 | 7.3 | Good | 3 to 5 |
| Comparative Example 1 | 5.7 | 7.2 | Good | 3 to 5 |
| Comparative Example 2 | 7.7 | 10.5 | Fish eyes observed | >20 |

As is evident from the above Examples, the granular vinyl chloride resin composition of the present invention is cylindrical or spherical granules, whereby dusting is little, the powder flowability is excellent, and automatic weighing is possible.

Further, since the bulk density is high, the space for transportation or storage can be saved, and the amount to be treated per operation can be increased when kneading is conducted by means of a machine having a constant volume. Further, the compressibility is low, whereby solidification or coagulation during the storage is less likely.

Further, when this granular vinyl chloride resin composition is used for the preparation of a plastisol, the resulting plastisol shows dispersibility equal to or superior to the plastisol obtained by mixing a conventional vinyl chloride resin for a paste and a filler, and it is effective also from the viewpoint of the improvement of the processing speed i.e. the improvement of the productivity. Especially with the composition extrusion-molded into a cylindrical shape, good results can be obtained. Further, the increase in plastisol-viscosity with time is little, and the storage stability is excellent.

Accordingly, the granular vinyl chloride resin composition of the present invention is useful as a paste resin and can be used in the field of carpet tiles, sealants and molding materials. Further, it is suitable for use as chip materials for cushion floor and for floor tiles.

Further, if at least two types of granular vinyl chloride resin compositions having different filler contents are preliminarily prepared, it is possible to optionally adjust the amount of the filler within the ranges of the filler contents of the respective compositions by mixing these compositions, whereby preparation of a plastisol can be facilitated, and no separate addition of the filler will be required, which is advantageous from the viewpoint of efficient processing.

I claim:

1. A granular vinyl chloride resin composition in the form of spherical or cylindrical granules having a size of from 0.05 to 20 mm which is obtained by extrusion-granulating or rolling-granulating a mixture comprising, as the main components, 100 parts by weight of fine vinyl chloride resin particles having a particle size of from 0.01 to 3 μm obtained from a vinyl chloride polymer latex obtained by emulsion polymerization or fine suspension polymerization, said mixture further comprising coarse vinyl chloride resin particles in an amount of 30 to 100 parts by weight, said coarse vinyl chloride resin particles having a particle size of from 5 to 65 μm, and from 10 to 400 parts by weight of a filler.

2. The granular vinyl chloride resin composition according to claim 1, wherein the particle size of the coarse vinyl chloride resin particles is from 20 to 40 μm.

3. The granular vinyl chloride resin composition according to claim 1 or 2, wherein the coarse vinyl chloride resin particles are those obtained by spray-drying a vinyl chloride polymer latex obtained by emulsion polymerization or fine suspension polymerization, by means of a double fluid nozzle.

4. The granular vinyl chloride resin composition according to claim 1, wherein the particle size of the filler is from 0.01 to 100 μm.

5. The granular vinyl chloride resin composition according to claim 1, wherein the particle size of the filler is from 0.05 to 20 μm.

6. The granular vinyl chloride resin composition according to claim 1, wherein the amount of the filler is from 30 to 200 parts by weight per 100 parts by weight of the fine vinyl chloride resin particles.

7. The granular vinyl chloride resin composition according to claim 1, wherein the filler is an inorganic filler.

8. The granular vinyl chloride resin composition according to claim 1, wherein the filler is calcium carbonate powder.

9. The granular vinyl chloride resin composition according to claim 1, wherein the cylindrical granules have a diameter of from 0.1 to 3 mm and a length of from 3 to 10 mm.

10. The granular vinyl chloride resin composition according to claim 1, wherein said resin has a bulk density of 0.65–0.87 g/cc and a compressibility of 4–10%.

11. The granular vinyl chloride resin composition according to claim 1, wherein said fine vinyl chloride resin particles are prepared by emulsion polymerization or fine suspension polymerization to form a polyvinylchloride latex and wherein the filler is added to said latex.

12. A plastisol composition obtained by blending a plasticizer to the granular vinyl chloride resin composition as defined in claim 11, in an amount of from 30 to 400 parts by weight per 100 parts by weight of the vinyl chloride resin in the vinyl chloride resin composition.

13. The granular vinyl resin composition according to claim 1, which is in the form of spherical or cylindrical granules having a size of from 0.1 to 3 mm.

14. The granular vinyl chloride resin composition according to claim 1, which is obtained by extrusion-granulating or rolling-granulating the mixture, after adjusting the solid content composition of the mixture to from 55 to 95% by weight.

15. The granular vinyl chloride resin composition according to claim 1, which is in the form of spherical or cylindrical granules having a size of from 0.1 to 3 mm, and obtained by extrusion-granulating or rolling-granulating the mixture after adjusting the solid content concentration of said mixture to from 55 to 95% by weight.

16. A plastisol composition obtained by blending a plasticizer to a granular vinyl chloride resin composition in the form of spherical or cylindrical granules having a size of from 0.05 to 20 mm which is obtained by extrusion-granulating or rolling-granulating a mixture comprising, as the main components, 100 parts by weight of fine vinyl chloride resin particles having a particle size of from 0.01 to 3 μm obtained from a vinyl chloride polymer latex obtained by emulsion polymerization or fine suspensions polymerization, said mixture further comprising course vinyl chloride resin particles in an amount sufficient to reduce the viscosity of said plastisol composition relative to a plastisol composition prepared from a resin composition without said course vinyl chloride resin particles, said course vinyl chloride resin particles having a particle size of from 5 to 65 μm, and from 10 to 400 parts by weight of filler, in an amount of from 30 to 400 parts by weight per 100 parts by weight of the vinyl chloride resin in the granular vinyl chloride composition.

17. A granular vinyl chloride resin composition in the form of spherical or cylindrical granules having a size of from 0.05 to 20 mm which is obtained by extrusion-granulating or rolling-granulating a mixture comprising, as the main components, 100 parts by weight of fine vinyl chloride resin particles having a particle size of from 0.01 to 3 μm obtained by emulsion polymerization or fine suspension polymerization, coarse vinyl chloride resin particles having a particle size of from 5 to 65 μm, said coarse vinyl chloride resin particles being present in an amount of 30 to 100 parts by weight, and from 10 to 400 parts by weight of a filler, said composition prepared by a process comprising the steps of:

adding and mixing from 10 to 400 parts by weight of a filler and coarse vinyl chloride resin particles having a particle size of from 5–65 μm, said coarse vinyl chloride resin particles being present in an amount of at most 100 parts by weight, to a vinyl chloride polymer latex containing 100 parts by weight of fine vinyl chloride resin particles having a particle size of from 0.01 to 3 μm obtained by emulsion polymerization or fine suspension polymerization, and then extrusion-granulating or rolling-granulating the mixture into spherical or cylindrical granules having a size from 0.05 to 20 mm.

18. A process for producing a granular vinyl chloride resin composition, which comprises the steps of:

adding and mixing from 10 to 400 parts by weight of a filler and coarse vinyl chloride resin particles in an amount of 30 to 100 parts by weight, said coarse vinyl chloride resin particles having a particle size of from 5–65 μm to a vinyl chloride polymer latex containing 100 parts by weight of fine vinyl chloride resin particles having a particle size of from 0.01 to 3 μm, obtained by emulsion polymerization or fine suspension polymerization, and then extrusion-granulating or rolling-granulating the mixture into spherical or cylindrical granules having a size from 0.05 to 20 mm.

19. The process for producing a granular vinyl chloride resin composition according to claim 18, wherein the coarse vinyl chloride resin particles are those obtained by spray-drying a vinyl chloride polymer latex obtained by emulsion polymerization or fine suspension polymerization, by means of a double fluid nozzle.

20. The process for producing a granular vinyl chloride resin composition according to claim 18 or 19, wherein the particle size of the filler is from 0.01 to 100 μm.

21. The process for producing a granular vinyl chloride resin composition according to claim 18, wherein the drying is conducted at a temperature within a range of from 10° to 50° C.

22. The process for producing a granular vinyl chloride resin composition according to claim 18, wherein in order to extrusion-granulate the mixture obtained by mixing the filler and, the coarse vinyl chloride resin particles to the latex, the water content of said mixture is adjusted to from 5 to 45% by weight, and then, the mixture is extrusion-granulated into a cylindrical shape at a temperature within a range of from 10° to 50° C.

* * * * *